US010230622B2

United States Patent
Cui et al.

(10) Patent No.: US 10,230,622 B2
(45) Date of Patent: Mar. 12, 2019

(54) INTEGRATED WIRELINE AND WIRELESS ACCESS USING SOFTWARE DEFINED NETWORKING

(71) Applicant: AT&T INTELLECTUAL PROPERTY I, L.P., Atlanta, GA (US)

(72) Inventors: Zhi Cui, Sugar Hill, GA (US); Paul Edward Smith, Jr., Rockwall, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 265 days.

(21) Appl. No.: 14/870,947

(22) Filed: Sep. 30, 2015

(65) Prior Publication Data
US 2017/0093704 A1 Mar. 30, 2017

(51) Int. Cl.
*H04L 12/707* (2013.01)
*H04L 29/12* (2006.01)
*H04W 48/00* (2009.01)
*H04L 12/725* (2013.01)
*H04L 12/54* (2013.01)
*H04L 12/26* (2006.01)

(52) U.S. Cl.
CPC .......... *H04L 45/22* (2013.01); *H04L 12/5692* (2013.01); *H04L 45/302* (2013.01); *H04L 61/6077* (2013.01); *H04W 48/17* (2013.01); *H04L 43/0894* (2013.01); *H04L 61/2007* (2013.01)

(58) Field of Classification Search
CPC .......................... H04L 43/0882; H04L 5/0058
See application file for complete search history.

(56) References Cited

U.S. PATENT DOCUMENTS

| 8,724,603 | B2 | 5/2014 | Barbu et al. | |
|---|---|---|---|---|
| 2007/0109991 | A1* | 5/2007 | Bennett | H04L 12/5692 370/328 |
| 2008/0181179 | A1* | 7/2008 | Karaoguz | H04W 8/20 370/331 |
| 2012/0230305 | A1 | 9/2012 | Barbu et al. | |
| 2013/0121207 | A1 | 5/2013 | Parker | |
| 2014/0133456 | A1 | 5/2014 | Donepudi et al. | |
| 2014/0328190 | A1* | 11/2014 | Lord | H04W 24/02 370/252 |

(Continued)

OTHER PUBLICATIONS

Amani, Mojdeh, et al. "SDN-Based Data Offloading for 5G Mobile Networks." ZTE Communications (2014): 34.

*Primary Examiner* — Shukri Taha
(74) *Attorney, Agent, or Firm* — Amin, Turocy & Watson, LLP

(57) ABSTRACT

An integrated wireless and wireline access system that uses software defined networking is provided to deliver communication services to user equipment via a variety of network access technologies. The software defined networking system can dynamically choose which network access technology to use to deliver services to the user equipment based on network conditions, quality of service concerns, and user equipment context. The user equipment can have different addresses based on the network access technology, and the software defined networking can redirect communications that are directed to a first address associated with the device on a first network to a second address associated with the same device on a second network.

20 Claims, 10 Drawing Sheets

(56) References Cited

U.S. PATENT DOCUMENTS

| | | |
|---|---|---|
| 2014/0355436 A1 | 12/2014 | Zhang et al. |
| 2015/0109995 A1 | 4/2015 | Mathai et al. |
| 2015/0156122 A1 | 6/2015 | Singh et al. |
| 2015/0163150 A1 | 6/2015 | Beheshti-Zavareh et al. |
| 2015/0188767 A1 | 7/2015 | Li et al. |
| 2015/0188933 A1 | 7/2015 | Zeitlin et al. |
| 2017/0005981 A1* | 1/2017 | Wang ................ H04L 45/64 |

* cited by examiner

800

802

| | TPE | RAT | Cell type | Load |
|---|---|---|---|---|
| eNB(a) | 1.1 | LTE | Macro cell | H |
| eNB(b) | 1.2 | LTE | Small cell | L |
| Wi-Fi AP (c) | 3.0 | Wi-Fi | 802.11n | L |
| AN (d) | 4.1 | Wireline BB | GPON 1:32 split | M |

804

| UE | Location | ACC-UL | ACC-DL | ACC-S | LCC | PCC-S | PCC-PBS |
|---|---|---|---|---|---|---|---|
| 1 | (x,y) | 1.1.0.1 | | | | | S |
| 2 | (x,y) | 4.1.0.2 | 1.1.0.2 | 1.1.0.2 | 1.2.0.2 | 4.1.0.2 | M |
| 3 | (x,y) | 1.1.0.3 | | 1.1.0.3 | 1.2.0.3 | 3.0.0.3 | M |

FIG. 8

INTEGRATED WIRELINE AND WIRELESS ACCESS USING SOFTWARE DEFINED NETWORKING

TECHNICAL FIELD

The subject disclosure relates to providing wireline and wireless access using software defined networking in an integrated communications environment.

BACKGROUND

With the proliferation of wireline and wireless networks of varying network access technologies, network operators have many different ways to communicate with networked devices. Each network is managed separately, however, and the same device can have different addresses associated with each network. Data that is transmitted to the device is delivered via the network that corresponds to the address that is associated with the data transfer. This reduces the network operator's ability to select the most suitable network access technology or network to deliver services to end users.

BRIEF DESCRIPTION OF THE DRAWINGS

FIG. 8 is an example, non-limiting embodiment of tables that store address information for integrated wireless and wireline access in accordance with various aspects described herein.

DETAILED DESCRIPTION

Figure 1:
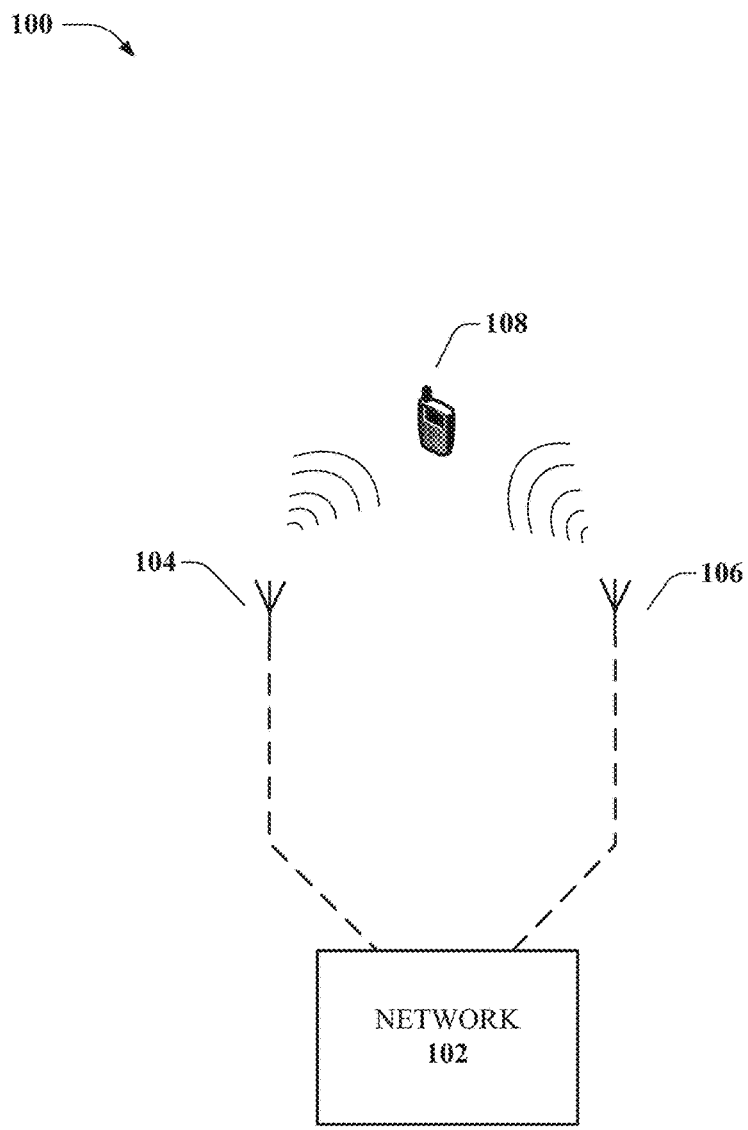
FIG. 1 is an example, non-limiting embodiment of a block diagram showing integrated wireless access using a software defined networking system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

An integrated wireless and wireline access system that uses software defined networking is provided to deliver communication services to user equipment via a variety of network access technologies. The software defined networking system can dynamically choose which network access technology to use to deliver services to the user equipment based on network conditions, quality of service concerns, and user equipment context. The user equipment can have different addresses based on the network access technology, and the software defined networking can redirect communications that are directed to a first address associated with the device on a first network to a second address associated with the same device on a second network.

In an embodiment, a user equipment may have several means by which to communicate with other user equipment and other devices via communications networks. For instance, a device may have a cellular connection with a mobile network, WiFi capability, and wireline access. The network operators can manage each network separately, so that service delivery is independent among these networks. The addresses of the user equipment are also allocated and managed separately, and so a device can have multiple different addresses that correspond to each network to which the device is connected. The addresses can be assigned by the respective networks.

For instance, if a device is connected to both a WiFi network and a cellular network, the addresses of the device can be assigned by the WiFi access point and/or core network and the serving packet gateway respectively. Traditionally, operators can deliver the data to the user equipment via the cellular network if the cellular IP address is used and delivered via the WiFi network if the WiFi address is used. Using the software defined networking controller disclosed herein, services can be delivered via any network regardless of what IP address is used.

For these considerations as well as other considerations, in one or more embodiments, a system comprises a processor and a memory that stores executable instructions that when executed by the processor, facilitate performance of operations, comprising receiving a transmission that has been directed to a first address of a user equipment, wherein the first address is associated with a first access point of a first network. The operations also comprise identifying a second network address of the user equipment associated with a second access point of a second network, wherein the first network and the second network utilize different network access technologies. The operations also comprise redirecting the transmission to the user equipment at the second address via the second access point in response to a network condition of the first network being determined to satisfy a network condition criterion.

In another embodiment, a method comprises receiving, by a device comprising a processor, a transmission that has been directed to a first network address of a user equipment, wherein the first network address is associated with a first network device of a first network using a first network access technology. The method comprises determining, by the device, that the user equipment is associated with a second network address associated with a second network device of a second network using a second network access technology. The method also comprises directing, by the device, the transmission to the user equipment at the second network address via the second network device in response to determining that the second network device satisfies a network condition criterion.

In another embodiment, a computer-readable storage device storing executable instructions that, in response to execution, cause a device comprising a processor to perform operations comprising receiving a data packet that has been directed to a first network address of a user equipment, wherein the first network address is associated with a first network access point device on a first network of first network devices. The operations also comprise determining that the user equipment is associated with a second network address associated with a second network access point device on a second network of second network devices. The operations further comprise determining that a congestion rating of a second network device of the second network devices is lower than a congestion rating of a first network device of the first network devices. The operations can further comprise directing, by the device, the transmission to the user equipment at the second network address via the second network access point device via the second network device.

Turning now to FIG. 1, illustrated is an example, non-limiting embodiment of a block diagram 200 showing integrated wireless access using a software defined networking system in accordance with various aspects described herein.

A mobile broadband network generally comprises a radio access network that facilitates communications between the mobile devices and a core network. In the case of Long Term Evolution ("LTE") networks and other 3rd Generation Partnership Project ("3GPP") compliant networks (e.g., LTE Advanced) and even non-3GPP systems such as WiMAX and CDMA2000, these networks are the radio access network and an evolved packet core network that can contain a series of components that provide mobile data and control management. WiFi networks as disclosed herein can include any networks that are compliant with IEEE 802.11 protocols. Wireline networks as disclosed herein can include passive optical networks, Ethernet, DSL (Digital Subscriber Line), cable, and other methods of providing communications over wired interfaces.

Network 102 can communicate with device 108 via two different radio access technologies corresponding to access point 104 and access point 106. In an embodiment, access point 104 can be an eNodeB associated with a cellular network, and access point 106 can be a WiFi access point. Device 108 can be a mobile device as depicted in FIG. 1, or in other embodiments can be any computing device capable of communicating with a plurality of networks via a plurality of network and radio access technologies.

The device 108 can have a first IP address associated with the first network that access point 104 is associated with, and can have a second IP address associated with the network that access point 106 is associated with. When data is being transferred to the device 108 from network 102, the network 102 selects which network to send the data to the device 108 based on the address indicated in the data transfer. A SDN controller in the network 102 can redirect the data transfer seamlessly to a different access point regardless of the address indicated in the data transfer. The SDN controller in the network 102 can make the switch based on network conditions, operator policy, based on quality of service requirements of applications active on the device 108, based on whether the device 108 is moving and other factors.

In an embodiment, the addresses associated with the device 108 can be assigned by the network 102, and the network 102 can maintain a database linking the addresses to the network access technologies associated with access points 104 and 106. In some embodiments, the addresses can be assigned by the access points 104 and 106. In an embodiment, the addresses that are assigned by the access points 104 and 106 can be random, and in other embodiments, the addresses can include a prefix code associated with the access points 104 and 106, and then the rest of the code can be random, semi-random, sequential, or based on the media access control ("MAC") address of the device 108. The SDN controller on the network 102 can learn the addresses associated with mobile device 108 and store the addresses in a table along with mobility state, and congestion information associated with the wireless and wireline networks associated with the access points (e.g., access point 104 and 106), and use the information in the table as needed to direct transmissions via either access point 104 or access point 106.

The SDN controller on the network 102 can receive a transmission that has been directed to device 108. The SDN controller can then select a network technology to transmit the data via, where the network technology is one of several networks that are connected to the device 108. The selected network can be selected based on the network satisfying a criterion related to the network condition. For instance, the network can be selected based on the load on the network being below a predetermined amount, or low relative to other networks. The network can be selected based on the quality of service requirements of active packet data protocol contexts between the network 102 and the device 108. The network can also be selected based on the mobility state of the device 108. For instance, if the device 108 is determined by the network 102 to be moving above a predetermined speed or velocity, the network 102 can select access point 104 which is an eNodeB and transmits data via a cellular protocol, and not access point 106 which is a WiFi access point and has a shorter range than access point 104.

In an embodiment, the network 102 can balance load and priority of communications with the device 108 in determining which access technology to use. For instance, if the device 108 is currently communicating with the network 102 via access point 104, and access point 106 has a lower load, network 102 may not switch to access point 106 if the priority of the communications with device 108 is above a predefined threshold in order to avoid disrupting the communications. On the other hand, even if the priority is above the predefined threshold, if the load on access point 104 is likely to cause disruptions or the ratio of load between access point 104 and access point 106 is above another predetermined threshold, network 102 can redirect the transmission to device 108 via access point 106.

In an embodiment, the network 102 can identify the addresses associated with device 108 based on header information on received transmissions from device 108. The network 102 can also send queries to access points 104 and 106 to identify all device addresses associated with each access point and then can cross reference the address lists to determine addresses on each network access technology for each device. In an embodiment, the device address of device 108 associated with each access point 104 and 106 can be its traditional address or can be assigned automatically, e.g. by combining eNodeB or Wi-Fi access point prefix and the device 108 local host address. In other embodiments, the address can instead be assigned by the packet gateway or Wi-Fi core network. The eNodebs and other access points broadcast their prefixes to device 108 which receives the prefixes from the cells and Wi-Fi APs and appends its own host address (e.g. lower 64 bits) to form one or multiple IP addresses, depending on the number of received prefixes of cells/AP. In an embodiment, the IP addresses can conform to either IPv4 or IPv6 standards.

Figure 2:
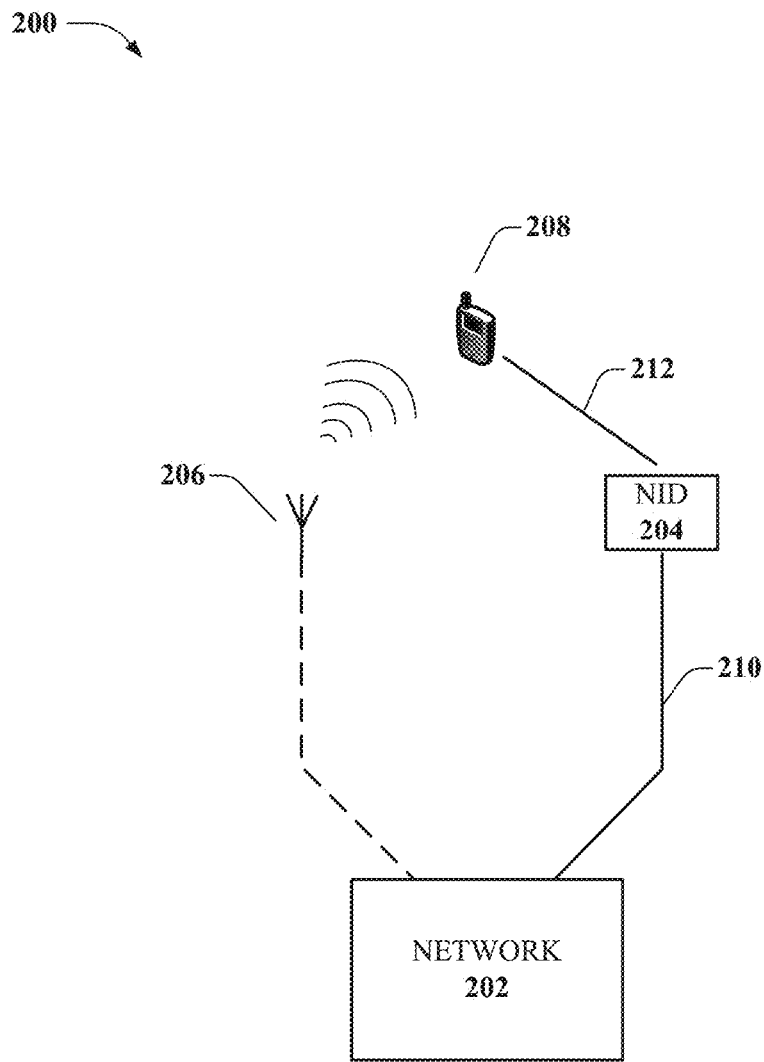
FIG. 2 is an example, non-limiting embodiment of a block diagram showing integrated wireless and wireline access using a software defined networking system in accordance with various aspects described herein.

Turning now to FIG. 2, illustrated is an example, non-limiting embodiment of a block diagram 200 showing integrated wireless and wireline access using a software defined networking system in accordance with various aspects described herein.

Network 202 can communicate with device 208 via an access point 206 of a radio access technology and via a network interface device 204 that is a wireline network. Network 202 can communicate with the device 208 by wireline network by transmitting the data via a wireline backhaul line 210 to the network interface device 204 and then via a local wireline 212. Wirelines 212 and 210 can be passive optical lines, either gigabit passive optical networks ("GPON") or Ethernet passive optical networks ("EPON"), or DSL, or cable, or Ethernet, or broadband over powerline or other wireline access technologies. Device 208 can be a mobile device as depicted in FIG. 2, or in other embodiments can be any computing device capable of communicating with a plurality of networks via a plurality of network and radio access technologies.

The device 208 can have a first IP address associated with the first network that network interface device 204 is associated with, and can have a second IP address associated with the network that access point 206 is associated with. When data is being transferred to the device 208 from network 202, the network 202 selects which network to send the data to the device 208 based on the address indicated in the data transfer. A SDN controller in the network 202 can redirect the data transfer seamlessly to a different access point regardless of the address indicated in the data transfer. The SDN controller in the network 202 can make the switch based on network conditions, operator policy, based on quality of service requirements of applications active on the device 208, based on whether the device 208 is moving and other factors.

In an embodiment, the addresses associated with the device 208 can be assigned by the network 202, and the network 202 can maintain a database linking the addresses to the network access technologies associated with network interface device ("NID") 204 and access point 206. In some embodiments, the addresses can be assigned by the NID 204 and 206. In an embodiment, the addresses that are assigned by the NID 204 and access point 206 can be random, and in other embodiments, the addresses can include a prefix code associated with the NID 204 and access point 206, and then the rest of the code can be random, semi-random, sequential, or based on the media access control ("MAC") address of the device 208. The SDN controller on the network 202 can learn the addresses associated with mobile device 208 and store the addresses in a table along with mobility state, and congestion information associated with the wireless and wireline networks associated with the access points (e.g., NID 204 and access point 206), and use the information in the table as needed to direct transmissions via either NID 204 or access point 206.

The SDN controller on the network 202 can receive a transmission that has been directed to device 208. The SDN controller can then select a network technology to transmit the data via, where the network technology is one of several networks that are connected to the device 208. The selected network can be selected based on the network satisfying a criterion related to the network condition. For instance, the network can be selected based on the load on the network being below a predetermined amount, or low relative to other networks. The network can be selected based on the quality of service requirements of active packet data protocol contexts between the network 202 and the device 208. The network can also be selected based on the mobility state of the device 208. For instance, if the device 208 is determined by the network 202 to be moving above a predetermined speed or velocity, the network 202 can select access point 206 which can be an eNodeB or WiFi access point and not NID 204.

Figure 3:
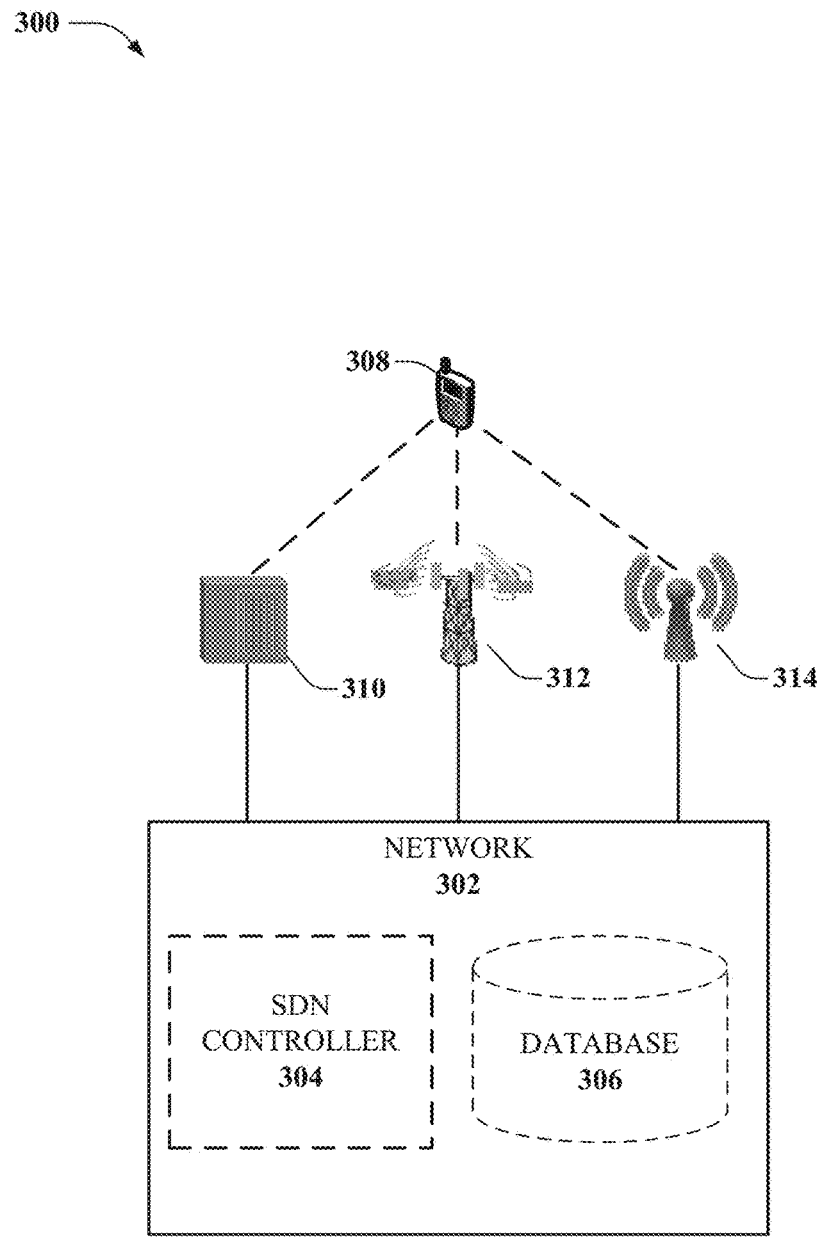
FIG. 3 is an example, non-limiting embodiment of a block diagram showing integrated wireless and wireline access using a software defined networking system in accordance with various aspects described herein.

Turning now to FIG. 3 illustrated is an example, non-limiting embodiment of a block diagram 300 showing integrated wireless and wireline access using a software defined networking system in accordance with various aspects described herein.

Network 302 can communicate with device 308 via access points 310, 312, and/or 314. Access point 310 can be an optical network termination of a passive optical network or can be a network interface device of another wireline access technology. Access point 312 can be an eNodeB of a cellular network and access point 314 can be a WiFi access point. Device 308 can be a mobile device as depicted in FIG. 3, or in other embodiments can be any computing device capable of communicating with a plurality of networks via a plurality of network and radio access technologies.

The device 308 can have a first IP address associated with the ONT 310, a second IP address associated with the eNodeB 312 and a third IP address associated with the WiFi access point 314. SDN controller 304 on the network 304 can identify the IP addresses of the device 308 on each network by examining header information in packets received from device 308. SDN controller 304 can also poll each of the access points 310, 312, and 314 for all device IP addresses associated with each access point and cross reference the addresses to learn each of the addresses for each device on each network. Database 306 can store the address information for each device in a table, and also store network condition information such as load, congestion, and mobility state information for device 308 and other devices.

The SDN controller 304 can access the table on database 306 and redirect transmissions directed to the device 308 via an address associated with one of the network access technologies, and redirect the transmission to another address associated with another network access technology. For example, the SDN controller 304 can redirect a transmission to the device 308 directed towards a first address for device 308 associated with the eNodeB 312, and redirect the transmission to a second address associated with the WiFi access point 314. The SDN controller 304 can redirect transmissions based on network conditions (e.g., load, congestion), on operator policy (e.g., quality of service requirements of applications or active packet data protocol contexts, priority of communications, etc) and on the mobility state of the device 308.

In an embodiment, the addresses associated with the device 308 can be assigned by the network 302, and the network 302 can maintain a table in the database 306 linking the addresses to the network access technologies associated with the access points 310, 312, and 314. In some embodiments, the addresses can be assigned by the access points 310, 312, and 314. In an embodiment, the addresses that are assigned by the access points 310, 312, and 314 can be random, and in other embodiments, the addresses can include a prefix code associated with the access points 310, 312, and 314, and then the rest of the code can be random, semi-random, sequential, or based on the media access control ("MAC") address of the device 308. The SDN controller 304 on the network 302 can learn the addresses associated with mobile device 308 and store the addresses in a table along with mobility state, and congestion information associated with the wireless and wireline networks associated with the access points (e.g., ONT 310, eNodeB 312, and WiFi access point 314), and use the information in the table as needed to direct transmissions via any of the access points.

The SDN controller 304 can receive a transmission that has been directed to device 308. The SDN controller can then select a network technology to transmit the data via, where the network technology is one of several networks that are connected to the device 308. The selected network can be selected based on the network satisfying a criterion related to the network condition. For instance, the network can be selected based on the load on the network being below a predetermined amount, or low relative to other networks. The network can be selected based on the quality of service requirements of active packet data protocol contexts between the network 302 and the device 308. The network can also be selected based on the mobility state of the device 308. For instance, if the device 308 is determined by the network 202 to be moving above a predetermined speed or velocity, the network 302 can select access point 312 which can be an eNodeB or WiFi access point 314 and not wireline access point 310.

Figure 4:
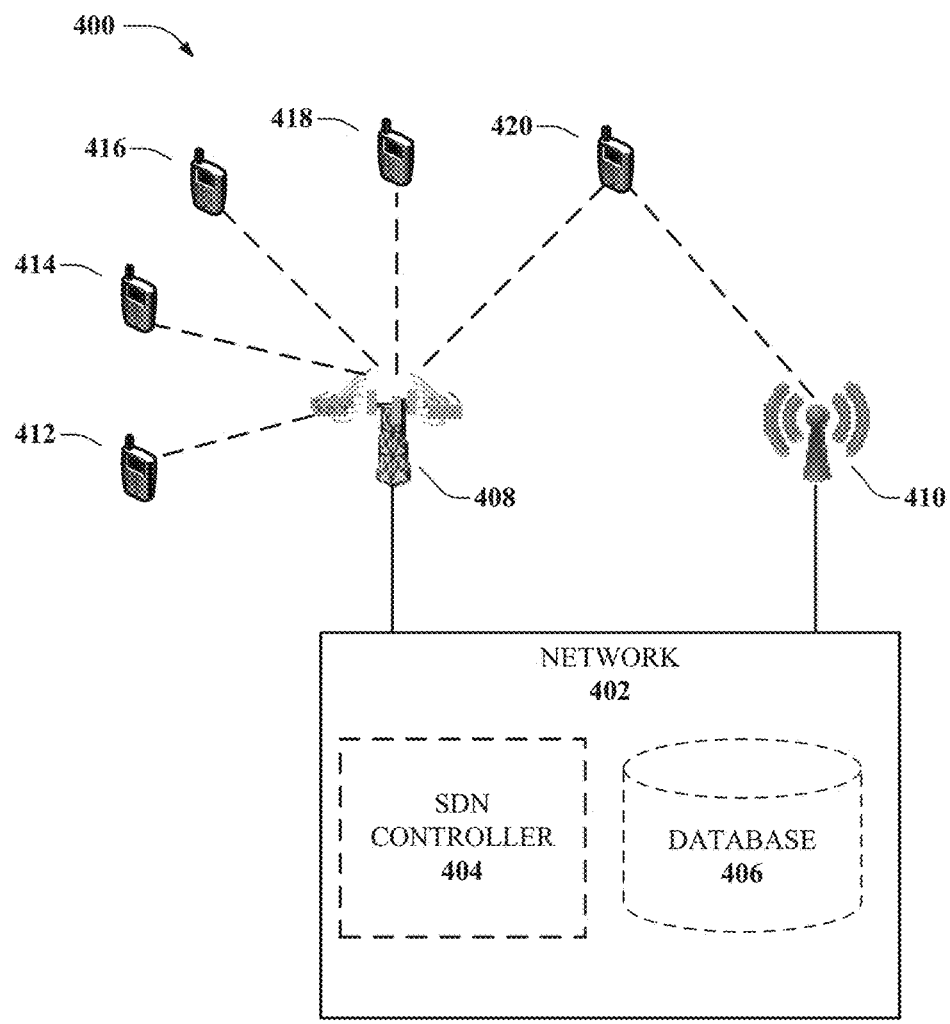
FIG. 4 is an example, non-limiting embodiment of a block diagram showing integrated wireless access load balancing using a software defined networking system in accordance with various aspects described herein.

Turning now to FIG. 4, illustrated is an example, non-limiting embodiment of a block diagram 400 showing integrated wireless access load balancing using a software defined networking system in accordance with various aspects described herein.

In the embodiment shown in FIG. 4, a network 402 can communicate with a device 420 via either an eNodeB access point 408 or a WiFi access point 410. An SDN controller 404 on the network 402 can select which network access technology to use to communicate with device 420 based on network conditions and operator policy. For instance, in the embodiment in FIG. 4, eNodeB access point 408 also has active packet data protocol context connections with device 412, 414, 416, and 418 in addition to device 420, while WiFi access point does not have any active connections with other devices. SDN controller 404 can use a table stored by database 406 to determine the load on access point 408, and if the load is above a predetermined threshold, or the ratio of load between the access points 408 and 410 is above another predetermined threshold, then the SDN controller 404 can reroute communications directed at an address for the device 420 associated with access point 408 to another address for the device 420 associated with access point 410.

In some embodiments, if the priority of the active packet data protocol context is high, SDN controller 404 may not redirect transmissions from the access point 408 to access point 410 if there is risk of disruption, or if eNodeB is rated for higher priority communications. The SDN controller 404 can however use a balancing test, and reroute the device transmissions if the risk of transfer disruption is lower than the risk of load disruption due to congestion on access point 408.

Figure 5:
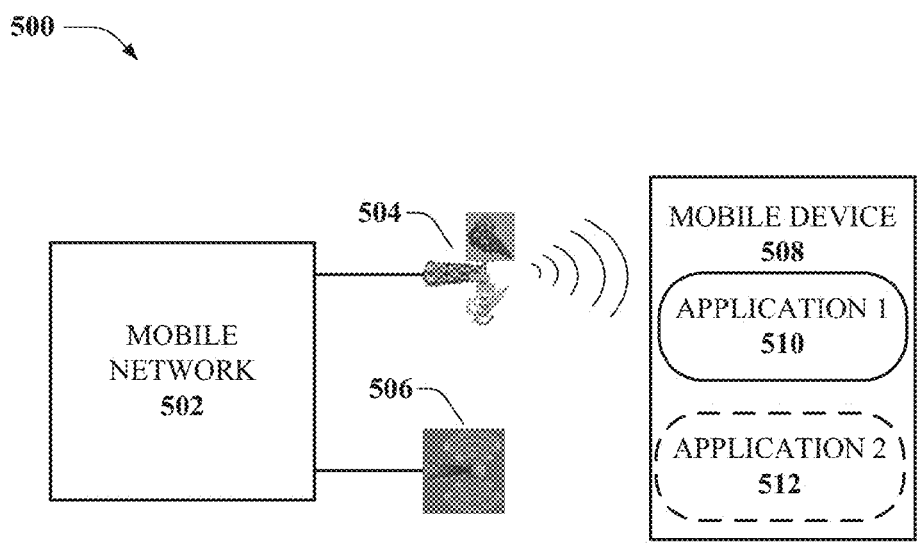
FIG. 5 is an example, non-limiting embodiment of a block diagram showing integrated wireless access quality of service balancing using a software defined networking system in accordance with various aspects described herein.
Figure 6:
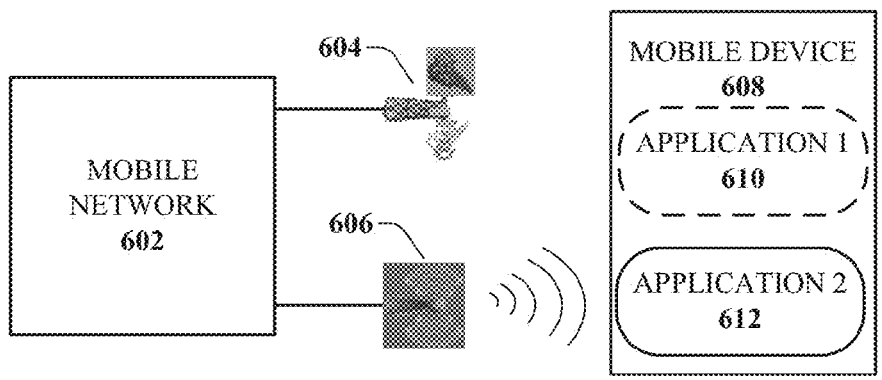
FIG. 6 is an example, non-limiting embodiment of a block diagram showing integrated wireless access quality of service balancing using a software defined networking system in accordance with various aspects described herein.

Turning now to FIGS. 5 and 6, illustrated are example, non-limiting embodiments of a block diagrams 500 and 600 showing integrated wireless access quality of service balancing using a software defined networking system in accordance with various aspects described herein. In block diagram 500, a mobile network 502 communicates with a mobile device 508 via a eNodeB access point 504. Device 508 has the capability of also communicating with the mobile network 502 via a WiFi access point 506, but that connection is not currently active. Mobile device 508 can have a plurality of applications installed on the device, including in this example, Application 1 510 and Application 2 512. In 500, the application 1 510 is active while application 2 512 is not active. An SDN controller on mobile network 502 can determine that the eNodeB access point 504 is the preferred network access technology to use to communicate with mobile device 508 based on network operator policy with regard to quality of service requirements of application 1 510.

By contrast however in FIG. 6, SDN controller on mobile network 602 can reroute transmissions to an address of mobile device 608 associated with WiFi access point 606 from eNodeB access point 604 since application 2 612 is now active while application 1 610 has been suspended.

Figure 7:
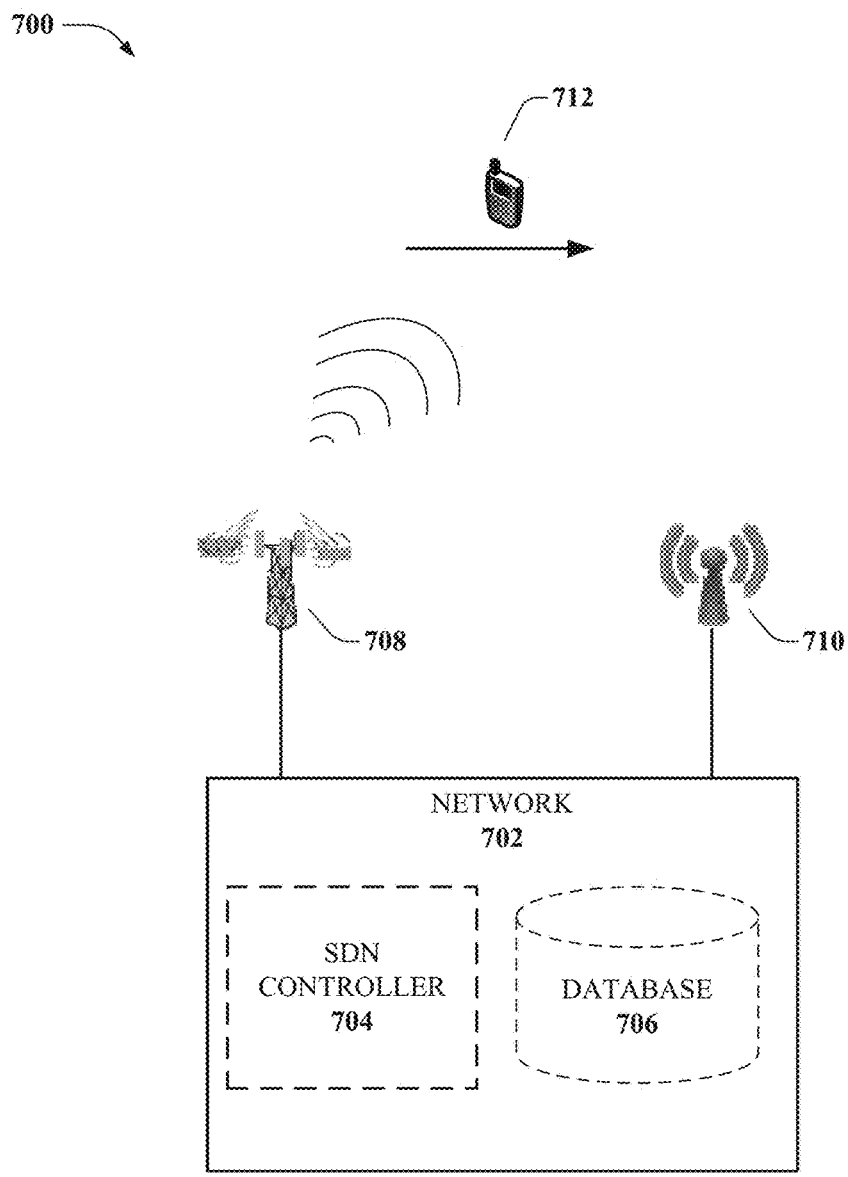
FIG. 7 is an example, non-limiting embodiment of a block diagram showing integrated wireless access with moving devices using a software defined networking system in accordance with various aspects described herein.

Turning now to FIG. 7, illustrated is an example, non-limiting embodiment of a block diagram 700 showing integrated wireless access with moving devices using a software defined networking system in accordance with various aspects described herein.

Network 702 can communicate with device 712 via two different radio access technologies corresponding to access point 708 and access point 710. In an embodiment, access point 708 can be an eNodeB associated with a cellular network, and access point 710 can be a WiFi access point. Device 712 can be a mobile device as or in other embodiments can be any computing device capable of communicating with a plurality of networks via a plurality of network and radio access technologies.

The device 712 can have a first IP address associated with the first network that access point 708 is associated with, and can have a second IP address associated with the network that access point 710 is associated with. When data is being transferred to the device 712 from network 702, the SDN controller 704 selects which network to send the data to the device 712 based on the address indicated in the data transfer. The SDN controller 704 in the network 702 can redirect the data transfer seamlessly to a different access point regardless of the address indicated in the data transfer. The SDN controller 704 in the network 102 can make the switch based on network conditions, operator policy, based on quality of service requirements of applications active on the device 704, and, for the purposes of the embodiment shown in FIG. 7, based on whether the device 712 is moving and other factors.

The access point can also be selected based on the mobility state of the device 712. The database 706 can store the mobility state of the device 712 such as information about whether it is moving, as well as velocity, speed, direction, location, etc. For instance, if the device 712 is determined by the SDN controller 704 to be moving above a predetermined speed or velocity, the SDN controller 704 can select access point 708 which is an eNodeB and transmits data via a cellular protocol, and not access point 710 which is a WiFi access point and has a shorter range than access point 708.

Turning now to FIG. 8, illustrated is an example, non-limiting embodiment 800 of tables 802 and 804 that store address information for integrated wireless and wireline access in accordance with various aspects described herein. Table 802 is an exemplary table showing a list of access points in the first column, a number designation in the second column, a radio access/network access technology type in the third column, a celltype in the fourth column, and a load on each of the access points in the fifth column, with H referring to a high load, M to a medium load, and L to a low load. In other embodiments, load can be stored in the table as a quantitative value, such as the total bandwidth and bandwidth used, percentage used, capacity, etc.

In the table 804, the first column is a list of user equipment or devices connected to the network, and then the second column shows a location of each of the devices. Columns three through seven show addresses for each of the devices on each of the access points, where the prefix or first two letters of the address correspond to the number designation in the first column. The eighth column references the mobility states such as S (static) and M (mobile). In other embodiments, the mobility state can include quantitative values such as the velocity or speed of the devices.

Figure 9:
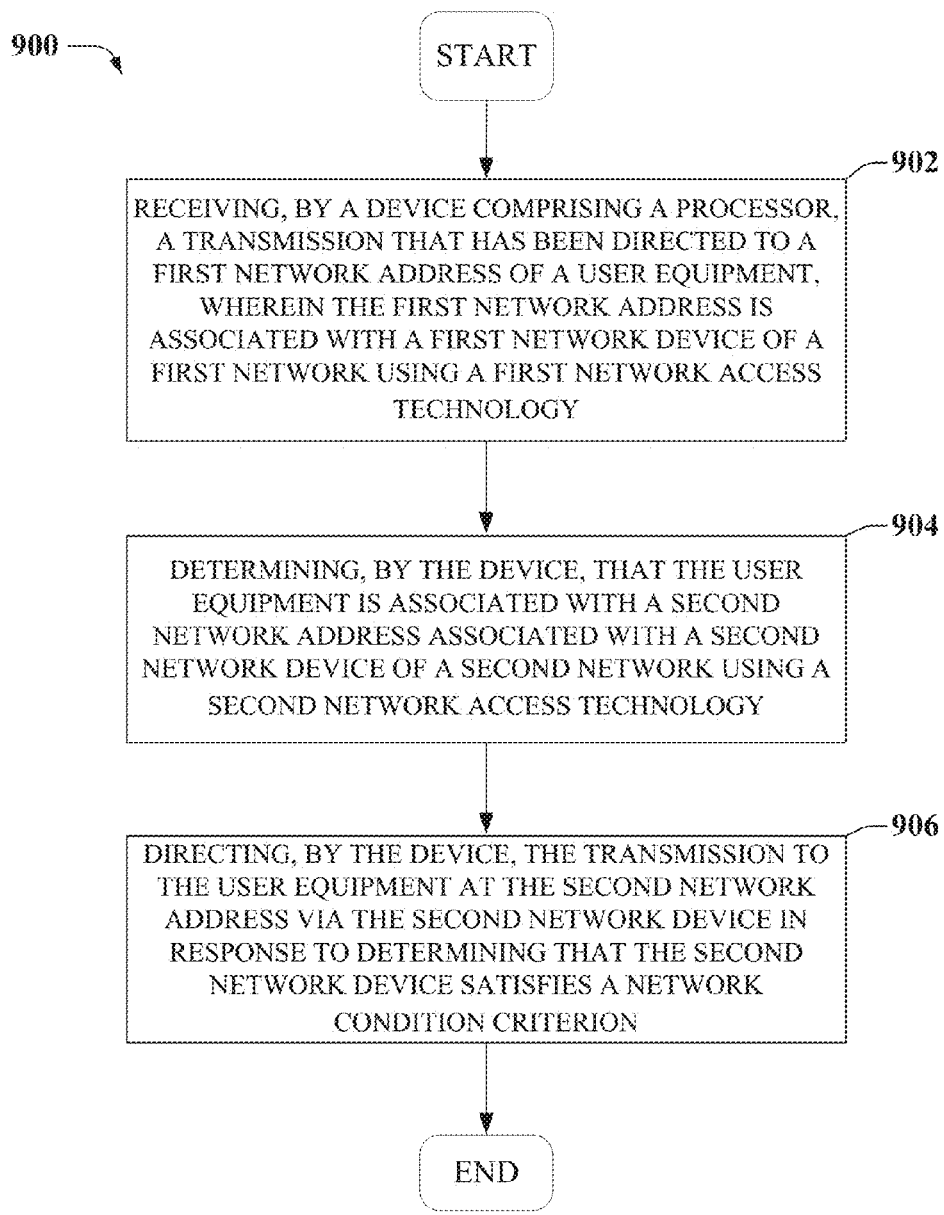
FIG. 9 illustrates a flow diagram of an example, non-limiting embodiment of a method for providing integrated wireless and wireline access using software defined networking as described herein.

FIG. 9 illustrates a process in connection with the aforementioned systems. The process in FIG. 9 can be implemented for example by the systems in FIGS. 1-7. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates a flow diagram of an example, non-limiting embodiment of a method for providing integrated wireless and wireline access using software defined networking as described herein Method 900 can begin at 902 where the method includes receiving, by a device comprising a processor, a transmission that has been directed to a first network address of a user equipment, wherein the first network address is associated with a first network device of a first network using a first network access technology.

At method step 904, the method includes determining, by the device, that the user equipment is associated with a second network address associated with a second network device of a second network using a second network access technology. At 906, the method includes directing, by the device, the transmission to the user equipment at the second network address via the second network device in response to determining that the second network device satisfies a network condition criterion.

Figure 10:
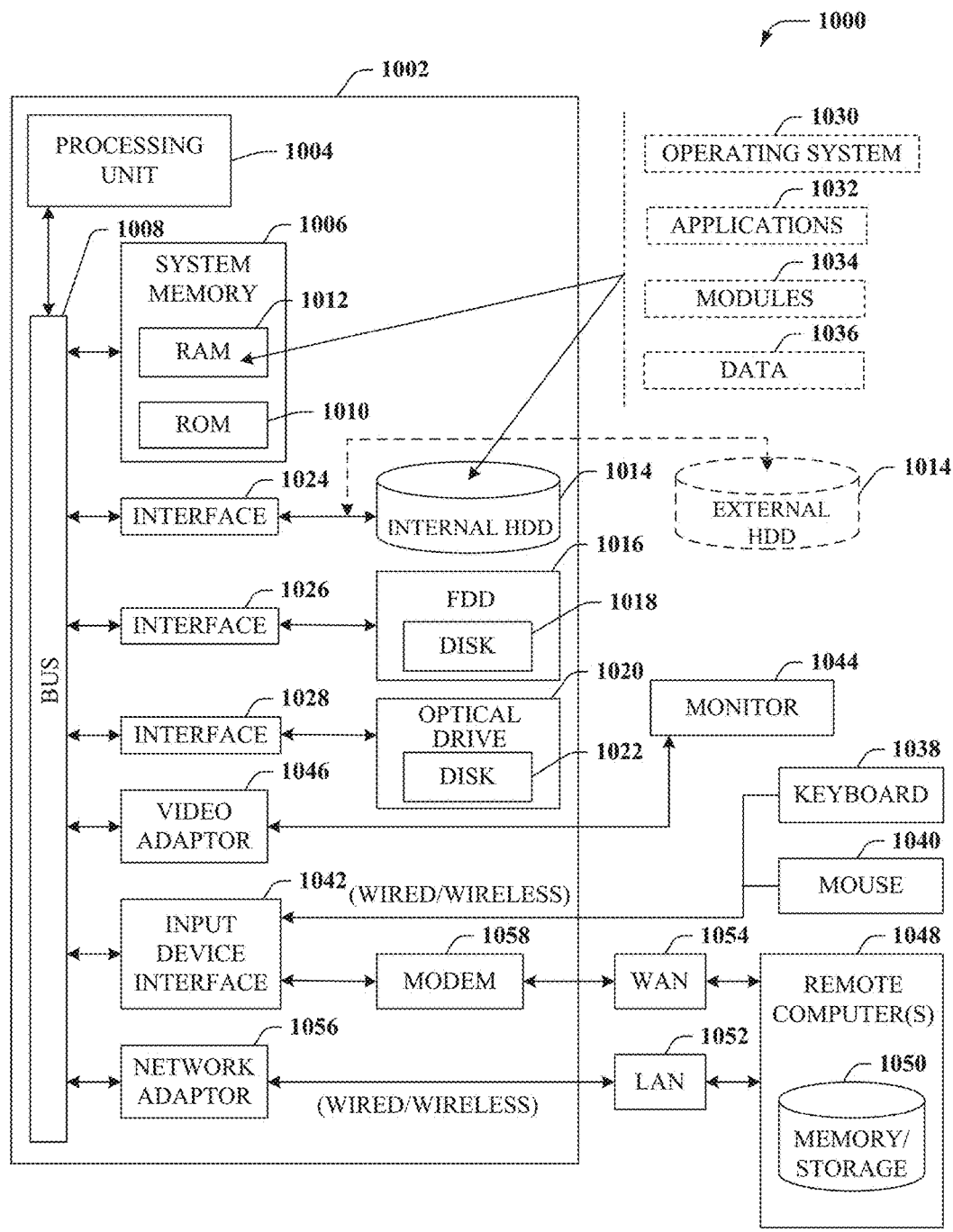
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within the radio repeater system disclosed in any of the previous systems 100, 200, 300, 400, 500, 600, and/or 700.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004. The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the software defined networking controllers disclosed in FIGS. 1-7 can be operated from. For instance, the virtual machines disclosed herein can be applications 1032 stored in hard drive 1014 and executed by processing unit 1004.

Figure 11:
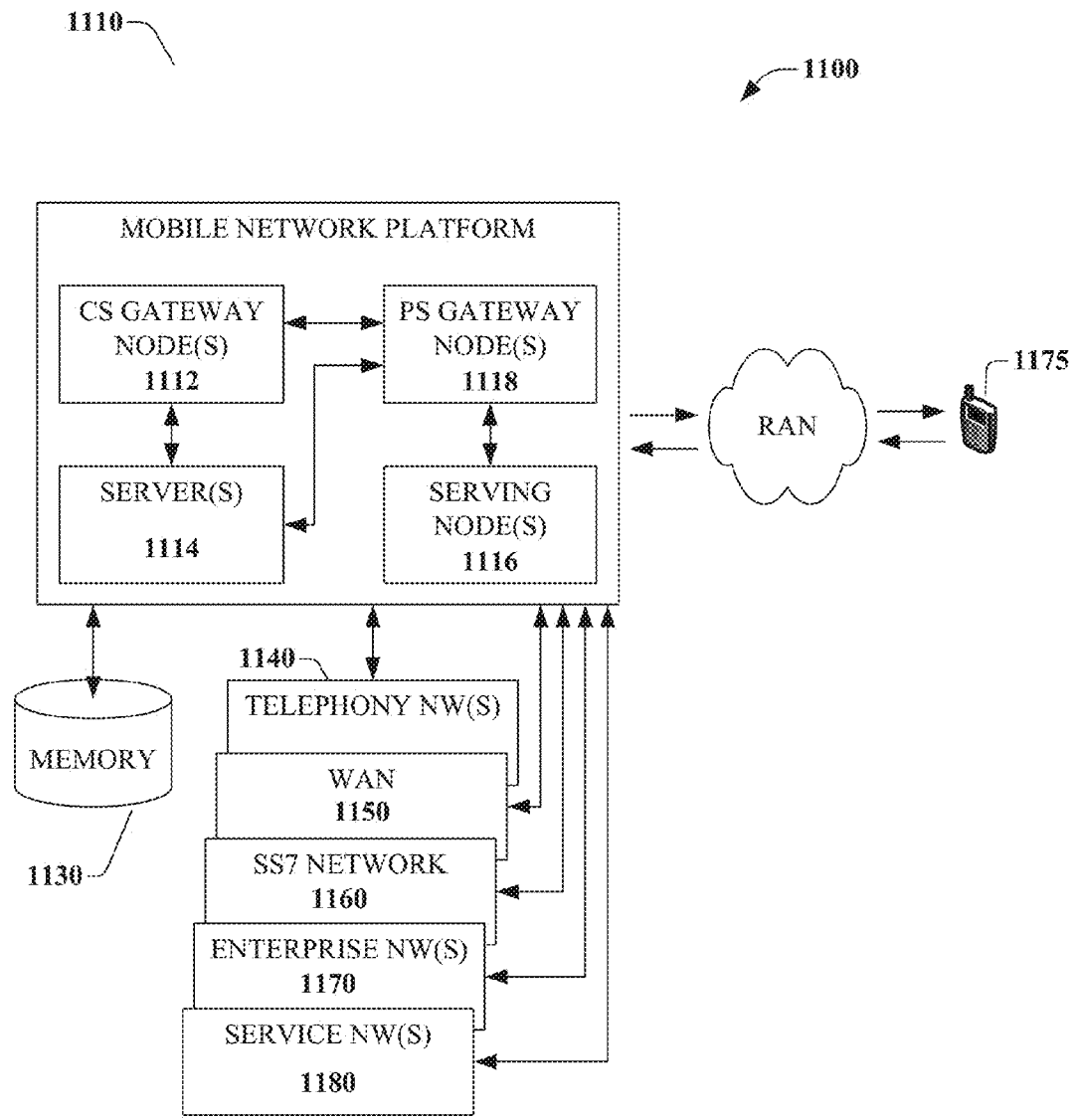
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIGS. 10 and 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a transmission that has been directed to a first network address of a user equipment, wherein the first network address is associated with a first access point device of a first network;

identifying a second network address of the user equipment associated with a second access point device of a second network, wherein the first network and the second network utilize different network access technologies;

determining a quality of service requirement of an active packet data protocol context associated with the transmission; and redirecting the transmission to the user equipment at the second address via the second access point device in response to a first network condition of the first network being determined not to satisfy the quality of service requirement, a second network condition of the second network being determined to satisfy the quality of service requirement, and determination that a risk of a transfer disruption redirecting the transmission being lower than a risk of a load disruption due to a load associated with the first network.

2. The system of claim 1, wherein the operations further comprise:
determining the first network address based on a prefix associated with the first access point device associated with the first network.

3. The system of claim 1, wherein the operations further comprise:
associating the first network address of the user equipment with the second network address of the user equipment.

4. The system of claim 1, wherein the operations further comprise:
associating a media access control address of the user equipment with the first network address and the second network address.

5. The system of claim 1, wherein the operations further comprise:
selecting the second network based on a mobility state of the user equipment.

6. The system of claim 1, wherein the quality of service parameter is based on an operator policy and an active application on the user equipment.

7. The system of claim 1, wherein the first network condition and the second network condition are based on a function of network congestion of the first network and the second network, used bandwidth of the first network and the second network, available bandwidth of the first network and the second network, and predicted congestion of the first network and the second network.

8. The system of claim 1, wherein the first network condition and the second network condition are based on a ratio of a first network congestion level of the first network and a second network congestion level of the second network.

9. The system of claim 1, wherein the operations further comprise:
receiving information from a first network access point device comprising a media access control address and the first network address of the user equipment connected to the first access point device.

10. The system of claim 9, wherein the operations further comprise:
receiving information from a second network access point device on a different network than the first access point device, wherein the information comprises the media access control address.

11. A method, comprising:
receiving, by a device comprising a processor, a transmission that has been directed to a first network address of a user equipment, wherein the first network address is associated with a first network device of a first network using a first network access technology;

determining, by the device, that the user equipment is associated with a second network address associated with a second network device of a second network using a second network access technology;

determining, by the device, a quality of service requirement for an active packet data protocol context associated with the transmission; and directing, by the device, the transmission to the user equipment at the second network address via the second network device in response to determining that the second network device has a second network condition that satisfies the quality of service requirement, the first network device does not have a first network condition that satisfies the quality of service requirement, and a result of a function of a risk of transfer disruption of directing the transmission to the second network, a risk of a load disruption due to a load of the first network, and a priority of the transmission.

12. The method of claim 11, further comprising:
determining, by the device, the second network address based on a prefix associated with a network access point device associated with the second network device.

13. The method of claim 11, further comprising:
associating, by the device, the first network address of the user equipment with the second network address of the user equipment.

14. The method of claim 11, further comprising:
associating, by the device, a media access control address of the user equipment with the first network address and the second network address.

15. The method of claim 11, wherein the directing the transmission to the user equipment at the second network address is based on a mobility state of the user equipment.

16. The method of claim 11, wherein the second network condition criterion is based on a function of network congestion of the second network device, used bandwidth of the second network device, available bandwidth of the second network device, and predicted congestion of the second network device.

17. The method of claim 11, further comprising:
receiving, by the device, information from a network access point device associated with the second network device comprising a media access control address and the second network address of the user equipment connected to the network access point device.

18. A non-transitory machine-readable storage medium, comprising executable instructions that, when executed by a processor, facilitate performance of operations, comprising:
receiving a data packet that has been directed to a first network address of a user equipment, wherein the first network address is associated with a first network access point device on a first network of first network devices;

determining that the user equipment is associated with a second network address associated with a second network access point device on a second network of second network devices;

determining that a congestion rating of a second network device of the second network devices is lower than a congestion rating of a first network device of the first network devices the congestion rating of the first network device does not satisfy a quality of service, requirement of an active packet data protocol context associated with the data packet, and a risk of a transfer disruption redirecting the transmission is lower than a risk of a load disruption due to a load associated with the first network; and directing, by the device, the transmission to the user equipment at the second network address via the second network access point device via the second network device.

19. The non-transitory machine-readable storage medium of claim 18, wherein the operations further comprise:
determining the second network address based on a prefix associated with the second network access point device.

20. The non-transitory machine-readable storage medium of claim 18, wherein the first and second congestion ratings are based on a function of used bandwidths of the first network device and the second network device, available bandwidths of the first network device and the second network device, and predicted congestions of the first network device and the second network device.

* * * * *